United States Patent [19]
Kuriyama et al.

[11] Patent Number: 5,459,993
[45] Date of Patent: Oct. 24, 1995

[54] CHAIN HAVING AN IMPROVED LUBRICANT SEALING STRUCTURE

[75] Inventors: Satoshi Kuriyama, Nakagyo; Kazuya Enomoto, Suita; Makoto Fujiwara, Takarazuka, all of Japan

[73] Assignee: Tsubakimoto Chain Co., Osaka, Japan

[21] Appl. No.: 288,089

[22] Filed: Aug. 10, 1994

[30]  Foreign Application Priority Data

Aug. 31, 1993 [JP] Japan ................ 5-051642 U

[51] Int. Cl.⁶ ......................................... F16G 13/06
[52] U.S. Cl. ................ 59/4; 474/207; 184/15.1; 59/78
[58] Field of Search ............... 59/4, 5, 78; 474/206, 474/207; 184/15.1

[56] References Cited

U.S. PATENT DOCUMENTS

| | | | |
|---|---|---|---|
| 2,411,207 | 11/1946 | Hait | 474/207 |
| 2,411,214 | 11/1946 | Keech | 474/207 |
| 3,948,574 | 4/1976 | Baylor | 474/207 |

FOREIGN PATENT DOCUMENTS 238734  9/1989  Japan ................ 59/4

*Primary Examiner*—David Jones
*Attorney, Agent, or Firm*—Howson and Howson

[57] ABSTRACT

In a roller chain having a seal between inner and outer link plates, an encircling member is provided which surrounds the seal to reduce entry of foreign particles and maintain minimum separation between the link plates.

2 Claims, 2 Drawing Sheets

CHAIN HAVING AN IMPROVED LUBRICANT SEALING STRUCTURE

BRIEF SUMMARY OF THE INVENTION

This invention relates generally to chains, for example chains of the type used in a conveyor. It is specifically concerned with an improved structure for sealing the lubricant which is used in the chain to lubricate the outer surface of a connecting pin and the inner surface of a bushing surrounding the connecting pin.

Laid-open Japanese Patent Application No. 238734/1990 describes a conventional sealing structure for a roller chain having a bushing. A sealing ring is disposed between an inner link plate and an outer link plate. One side of the ring is secured to the inner link plate and the other side of the ring elastically contacts the outer link plate, or vice versa. This prevents the ring from being displaced, and helps to prevent leakage of lubricant. Multiple lips are provided on the elastically contacting surface of the ring to define a lubricant pool. The ring limits the movement of the inner and outer link plates toward each other.

In the conventional sealing structure, the sealing ring, disposed between the inner and outer link plates, is exposed to the exterior of the conveyor chain. Foreign matter is thus able to adhere freely to the sealing ring. Foreign matter causes wear of the sealing ring and detracts from its ability to provide an effective seal. Shocks imparted to the inner or outer link plates in the normal operation of the conveyor chain also tend to deform, or otherwise damage, the sealing ring. Increasing the thickness of the sealing ring is not an acceptable solution to this problem because the ring would still eventually wear down and thus fail to separate the inner and outer link plates effectively.

The chain in accordance with the invention has a series of sections. Each section includes an inner link plate disposed on a bushing. The bushing extends through, and protrudes beyond, the inner link plate. An outer link plate is disposed on a connecting pin extending through the bushing. The improved sealing structure comprises an annular sealing member, having annular first and second sealing surfaces at radially different locations on its opposite faces. The sealing member is disposed on the protruding end portion of the bushing, and is positioned between the inner and outer link plates. The first sealing surface of the sealing member contacts the outer side surface of the inner link plate, and the second sealing surface of the sealing member contacts the inner side surface of the outer link plate. An encircling member, encircling the annular sealing member, is secured either to the inner side surface of the outer link plate or to the outer side surface of the inner link plate. The encircling member faces, and is spaced from, the other side surface. The encircling member maintains a predetermined minimum separation between the inner and outer link plates and prevents foreign matter from passing between the link plates to the vicinity of the annular sealing member.

DETAILED DESCRIPTION

Figure 1:
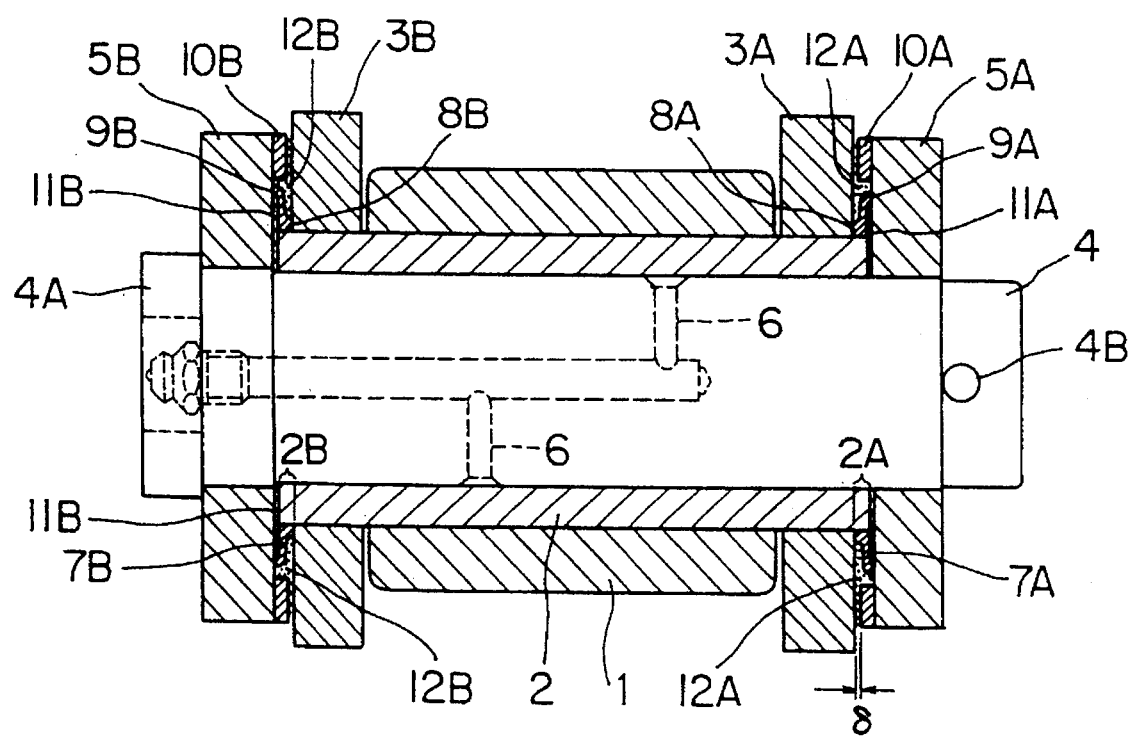
FIG. 1 is a view in cross-section of a chain link having a lubricant sealing structure in accordance with the invention.
Figure 2:
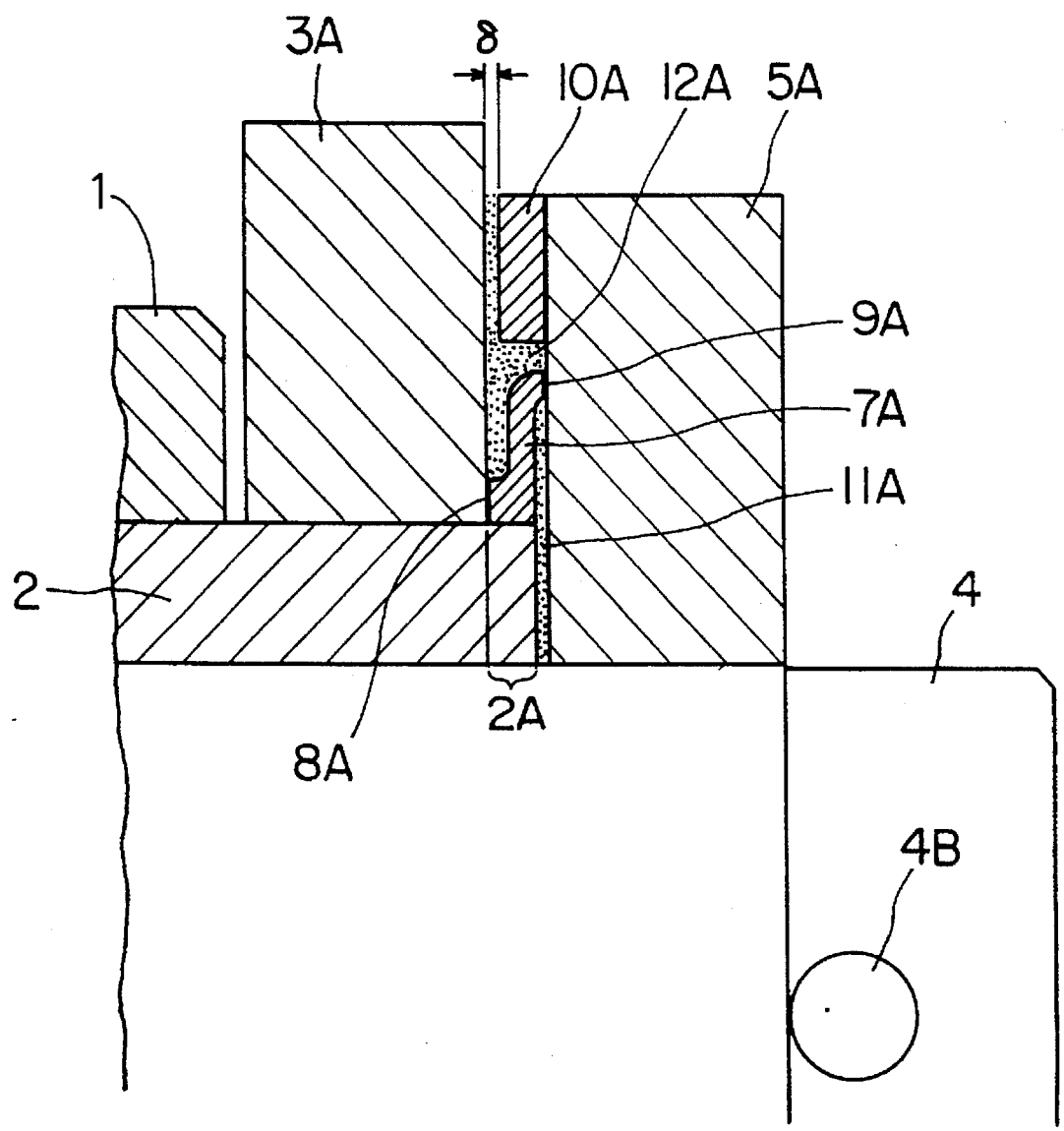
FIG. 2 is an enlarged fragmentary view in cross-section of the chain link of FIG. 1.

The chain link having a lubricant sealing structure in accordance with the invention comprises a roller 1 which is rotatable on a bushing 2. Inner link plates 3A and 3B are press-fit at opposite ends of the bushing 2. The bushing 2 is rotatable on a connecting pin 4. Outer link plates 5A and 5B are mounted at opposite ends of the connecting pin 4. An enlarged portion 4A is formed at one end of the connecting pin 4, and a stop pin 4B is inserted at the other end. Multiple lubricant supply bores 6 are formed in the connecting pin 4. The lubricant supply bores 6 are open to the cylindrical surface of the connecting pin 4 and supply lubricant to the interface between bushing 2 and pin 4.

Both ends 2A and 2B of the bushing 2 protrude beyond the external side surfaces of the inner link plates 3A and 3B. This maintains a gap between inner link plate 3A and outer link plate 5A, and also maintains a gap between inner link plate 3B and outer link plate 5B.

Annular lip-shaped sealing members 7A and 7B are secured to the ends 2A and 2B of the bushing 2. The proximal side surfaces 8A and 8B of the annular lip-shaped sealing members 7A and 7B elastically contact the outer side surfaces of the inner link plates 3A and 3B respectively. The distal side surfaces 9A and 9B of the annular lip-shaped sealing members 7A and 7B slidably contact the inner side surfaces of the outer link plates 5A and 5B respectively.

Annular ring-shaped members 10A and 10B are secured to the inner side surfaces of the outer link plates 5A and 5B respectively, to encircle the sealing members 7A and 7B. A gap $\delta$ exists between inner link plate 3A and annular, ring-shaped, encircling member 10A, and also exists between inner link plate 3B and annular, ring-shaped, encircling member 10B.

Lubricant, for example grease, is retained in pools 11A and 11B, which are defined by the inner side surfaces of the outer link plates 5A and 5B, the sealing members 7A and 7B, and the end surfaces 2A and 2B of the bushing 2. Lubricant is also retained in pools 12A and 12B, which are defined by the outer side surfaces of the inner link plates 3A and 3B, the sealing members 7A and 7B, and the annular, ring-shaped, encircling members 10A and 10B.

Pools 11A and 11B provide a constant supply of lubricant to reduce wear on the sliding surfaces of the connecting pin 4 and the bushing 2. Pools 12A and 12B provide a constant supply of lubricant to reduce wear on the relatively sliding surfaces of the sealing members 7A and 7B and the outer link plates 5A and 5B. The annular ring-shaped members 10A and 10B prevent particles of foreign matter from entering the lubricant pools 11A, 11B, 12A, and 12B. This protects the sealing ring from being worn down by these particles.

The annular, ring-shaped, encircling members 10A and 10B maintain a predetermined minimum separation between the inner and outer link plates 3A, 3B, 5A, and 5B. The encircling members 10A and 10B prevent the ends 2A and 2B of the bushings 2 from contacting the internal side surfaces of the outer link plates 5A and 5B. The fact that the encircling members 10A and 10B are spaced by a distance $\delta$ from their adjacent inner link plates 3A and 3B avoids frictional contact between the encircling members 10A and 10B and the inner link plates 3A and 3B. It also protects the sealing members 7A and 7B from excessive deformation.

We claim:

1. In a conveyor chain having a series of sections, each section comprising an inner link plate having an outer side surface, the inner link plate being disposed on a bushing extending through the inner link plate and having an end portion protruding beyond said outer side surface; and an outer link plate having an inner side surface, the outer link plate being disposed on a connecting pin;

a sealing structure comprising an annular sealing member having opposite faces and annular first and second sealing surfaces respectively on said opposite faces, said sealing member being disposed on said protruding end portion of the bushing, and positioned between said inner and outer link plates, at least a portion of one of said sealing surfaces being radially closer than any portion of the other sealing surface to the bushing, and at least a portion of said other sealing surface being radially farther than any portion of said one sealing surface from said bushing;

wherein the first sealing surface of the sealing member contacts the outer side surface of the inner link plate, the second sealing surface of the sealing member contacts the inner side surface of the outer link plate, and substantially all portions of the sealing members are spaced from said link plates except at the locations of said sealing surfaces; and wherein said sealing structure further comprises an encircling member, encircling said annular sealing member, fixed to one of said inner and outer side surfaces, and facing, and spaced from, the other of said inner and outer side surfaces;

whereby said encircling member maintains a predetermined minimum separation between the inner and outer link plates and prevents foreign matter from passing between said link plates to the vicinity of said annular sealing member.

2. A conveyor chain according to claim 1 in which all portions of said one of said sealing surfaces are radially closer than any portion of the other sealing surface to the bushing, and all portions of said other sealing surface are radially farther than any portion of said one sealing surface from said bushing.

* * * * *